United States Patent
Yang et al.

(10) Patent No.: US 11,575,479 B2
(45) Date of Patent: Feb. 7, 2023

(54) METHOD AND APPARATUS FOR CONTROLLING UPLINK TRANSMISSION OF A USER EQUIPMENT OVER A PLURALITY OF SECONDARY CELLS IN A GROUP OF SECONDARY CELLS

(75) Inventors: Tao Yang, Shanghai (CN); Seau Sian Lim, Swindon (GB)

(73) Assignee: Nokia Technologies Oy, Espoo (FI)

( * ) Notice: Subject to any disclaimer, the term of this patent is extended or adjusted under 35 U.S.C. 154(b) by 2232 days.

(21) Appl. No.: 14/238,597

(22) PCT Filed: Jul. 31, 2012

(86) PCT No.: PCT/IB2012/001567
§ 371 (c)(1),
(2), (4) Date: Feb. 12, 2014

(87) PCT Pub. No.: WO2013/024333
PCT Pub. Date: Feb. 21, 2013

(65) Prior Publication Data
US 2014/0198762 A1    Jul. 17, 2014

(30) Foreign Application Priority Data
Aug. 12, 2011   (CN) .......................... 201110233635.2

(51) Int. Cl.
*H04W 56/00*   (2009.01)
*H04L 5/00*    (2006.01)

(52) U.S. Cl.
CPC ....... *H04L 5/0037* (2013.01); *H04W 56/0005* (2013.01); *H04W 56/0045* (2013.01)

(58) Field of Classification Search
CPC ... H04L 5/0037; H04L 5/0048; H04L 5/0051; H04L 5/0053; H04L 5/001; H04W 56/0005; H04W 56/0045; H04W 76/38
(Continued)

(56) References Cited

U.S. PATENT DOCUMENTS

| | | | |
|---|---|---|---|
| 2011/0134774 A1 | 6/2011 | Pelletier et al. | |
| 2011/0249635 A1* | 10/2011 | Chen | H04W 76/38 370/329 |

(Continued)

FOREIGN PATENT DOCUMENTS

| | | |
|---|---|---|
| CN | 101849366 A | 9/2010 |
| CN | 102014477 A | 4/2011 |

(Continued)

OTHER PUBLICATIONS

CATT, "Consideration on TA Group," $3^{rd}$ Generation Partnership Project (3GPP), 3GPP TSG RAN WG2 Meeting #74, R2-112814, pp. 1-3, XP050495245, Barcelona, Spain, May 9-13, 2011.
(Continued)

*Primary Examiner* — Harun Chowdhury
(74) *Attorney, Agent, or Firm* — Fay Sharpe LLP

(57) ABSTRACT

The invention proposes a method, in a carrier aggregation transmission-based radio communication network, of controlling uplink transmission of a user equipment over a plurality of secondary cells in a group of secondary cells, the user equipment being configured with a group of primary cells and at least one group of secondary cells, and the group of secondary cells belonging to the at least one group of secondary cells, wherein in the event that the group of primary cells and the at least one group of secondary cells each is configured with a time alignment timer, the method comprises the steps of: terminating the uplink transmission of the user equipment over at least one activated secondary cell in the group of secondary cells when the time alignment timer of the group of primary cells expires; in the event that the group of primary cells and the at least one group of secondary cells are configured with a common time alignment timer, the method comprises the steps of: determining whether a time alignment value of the group of secondary cells is valid when the time alignment timer is in operation;
(Continued)

and if not, terminating the uplink transmission of the user equipment over the at least one activated secondary cell in the group of secondary cells and transmitting a notification message to a base station.

16 Claims, 2 Drawing Sheets

(58) Field of Classification Search
USPC .............................. 370/328, 329, 336, 350
See application file for complete search history.

(56) References Cited

U.S. PATENT DOCUMENTS

| | | | | |
|---|---|---|---|---|
| 2012/0207089 | A1* | 8/2012 | Kone | H04L 5/001 370/328 |
| 2012/0281680 | A1* | 11/2012 | Bostrom | H04L 5/0051 370/336 |
| 2013/0028185 | A1* | 1/2013 | Wu | H04W 56/0045 370/328 |
| 2014/0161117 | A1* | 6/2014 | Sebire | H04W 56/0045 370/350 |

FOREIGN PATENT DOCUMENTS

| | | |
|---|---|---|
| EP | 02654337 A | 10/2013 |
| EP | 02685777 | 1/2014 |
| WO | 2011/063244 A2 | 5/2011 |
| WO | 2011/085200 A1 | 7/2011 |
| WO | 2011121173 A | 10/2011 |
| WO | 2012135992 A | 10/2012 |
| WO | WO2012134071 * | 10/2012 |

OTHER PUBLICATIONS

Panasonic, "Time Alignment in case of multiple TA," 3rd Generation Partnership Project (3GPP), 3GPP TSG-RAN WG2 Meeting #74, R2-112819, 3 pages, XP050495149, Barcelona, Spain, May 9-13, 2011.

"3rd Generation Partnership Project; Technical Specification Group Radio Access Network; Evolved Universal Terrestrial Radio Access (E-UTRA); Medium Access Control (MAC) protocol specification (Release 10)," ETSI 136 321 V10.2.0, pp. 1-55, XP050553468, Jun. 2011.

Alcatel-Lucent et al., Initiating timing alignment for SCell in multiple TA,: 3rd Generation Partnership Project (3GPP), 3GPP TSG-RAN WG2#74, R2-113235, pp. 1-6, XP050495175, Barcelona, Spain, May 9-13, 2011.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," ETSI TS 136 300 V10.4.0, pp. 1-207, XP050553479, Jun. 2011.

"3rd Generation Partnership Project; Technical Specification Group Radio Access Network; Evolved Universal Terrestrial Radio Access (E-UTRA); Physical layer procedures (Release 10)," ETSI 136 213 V10.2.0, pp. 1-121, XP050553381, Jun. 2011.

International Search Report for PCT/IB2012/001567 dated Mar. 11, 2013.

Interdigital Communications, "TAT expiry and D-SR failure," 3GPP TSG-RAN WG2 #71bis, Xian, Peoples Republic of China, Oct. 11-15, 2010, Tdoc R2-105861, (Update to R2-105754), Agenda Item: 7.1.1.3, Document for: Discussion, Decision, 7 pages.

Alcatel-Lucent, "Maintaining UL Synchronization for deactivated SCell", TSG-RAN WG2#74, May 9-13, 2011, R2-113234, Barcelona, Spain.

LG Electronics Inc., "Discussion on Diverse Data Applications", 3GPP TSG-RAN WG2 Meeting #73bis, Apr. 11-15, 2011, R2-112262, Shanghai, China.

InterDigital Communications, "Support for multiple Timing Advance in LTE CA", 3GPP TSG-RAN WG2 #74, May 9-13, 2011, R2-113255, Barcelona, Spain.

Ericsson, ST Ericsson, "Multiple TA with a single TAT", 3GPP TSG-RAN WG2 #74, May 9-13, 2010, R2-112984, Barcelona, Spain.

InterDigital Communications, "Support for RACH on SCeUs in LTE CA", 3GPP TSG-RAN WG2 #74, May 9-13, 2011, R2-113258, Barcelona, Spain.

Alcatel-Lucent, "Per UE vs per group TAT", TSG-RAN WG2#75, Aug. 22-26, 2011, R2-114317, Athens, Greece.

Samsumg; "UE behaviour upon TAT expiry and D-SR failure", 3GPP TSG-RAN2#70 meeting, R2-103552, Jun. 28-Jul. 2, 2010, Stockholm, Sweden.

* cited by examiner

METHOD AND APPARATUS FOR CONTROLLING UPLINK TRANSMISSION OF A USER EQUIPMENT OVER A PLURALITY OF SECONDARY CELLS IN A GROUP OF SECONDARY CELLS

FIELD OF THE INVENTION

The present disclosure relates to carrier aggregation-based radio communication and particularly to a method of controlling uplink transmission of a user equipment over a plurality of secondary cells in a group of secondary cells.

BACKGROUND OF THE INVENTION

In a communication system, a user equipment (UE) shall keep uplink synchronization with a base station (e.g., eNodeB) through time alignment (TA), that is, uplink signals transmitted from all user equipments of the base station shall arrive in synchronization at the base station to thereby avoid serious interference with the other user equipments.

In a Carrier Aggregation (CA) transmission-based radio communication network, a base station can configure a user equipment with a plurality of Component Carriers (CCs) so that the user equipment can communication with the base station over these component carriers, where one of the component carriers is referred to as Primary Cell (Pcell) and the other component carriers are referred to as Secondary Cell (Scell).

Unlike the 3GPP Release 10 in which respective cells of a user equipment share the same time alignment, the concept of Time Alignment Group (TA Group) has been proposed in the 3GPP Release 11. Respective cells of a user equipment are divided into one or more time alignment groups, and the cells in each time alignment group share the same time alignment. Time alignment groups are further divided into two categories: the Primary Cell Group (Pcell Group) including the primary cell and the Secondary Cell Group (Scell Group) including no primary cell.

Such a solution has also been proposed in the 3GPP Release 11 that each time alignment group of a user equipment is configured with a Time Alignment Timer (TAT). As for this solution, each time alignment group is configured with a time alignment timer, so such a scenario may arise that the time alignment timer of the primary cell group has expired while the time alignment timer of the secondary cell group is still in operation, and this scenario may require the definition of a new behavior of the user equipment.

Furthermore such a solution has been proposed in the 3GPP Release 11 that a user equipment is configured with a time alignment timer, that is, all of primary cell group and secondary cell groups of the user equipment share the time alignment timer. As for this solution, the time alignment timer operates based upon the primary cell group to guarantee the validity of time alignment of the primary cell group. Specifically upon reception of a time alignment instruction (e.g., to initially set time alignment or to update time alignment) of the primary cell group, the user equipment adjusts time alignment and restarts the time alignment timer in response to the received instruction; and upon reception of a time alignment instruction of the secondary cell group, the user equipment just adjusts time alignment but will not restart the time alignment timer in response to the received instruction. Since the time alignment timer operates only based upon the primary cell group, such a scenario may arise: although time alignment of the secondary cell group has actually been invalidated because a time alignment instruction of the secondary cell group has not been received for a long period of time, the time alignment timer has not expired because a time alignment instruction of the primary cell group has been received continuously, so that the user equipment considers that time alignment of the secondary cell group is still valid and thus continues sending uplink transmission, thus resulting in serious interference with other user equipments.

SUMMARY OF THE INVENTION

In view of the foregoing technical problem, according to an aspect of the invention, in an embodiment, there is provided a method, in a user equipment of a carrier aggregation transmission-based radio communication network, of controlling uplink transmission of the user equipment over a plurality of secondary cells in a group of secondary cells, the user equipment being configured with a group of primary cells and at least one group of secondary cells, the group of secondary cells belonging to the at least one group of secondary cells, and the group of primary cells and the at least one group of secondary cells each being configured with a time alignment timer, wherein the method comprises the step of: terminating the uplink transmission over at least one activated secondary cell in the group of secondary cells when the time alignment timer of the group of primary cells expires.

In another embodiment, there is provided a method, in a base station of a carrier aggregation transmission-based radio communication network, of controlling uplink transmission of a user equipment over a plurality of secondary cells in a group of secondary cells, the user equipment being configured with a group of primary cells and at least one group of secondary cells, the group of secondary cells belonging to the at least one group of secondary cells, and the group of primary cells and the at least one group of secondary cells each being configured with a time alignment timer, wherein the method comprises the step of: transmitting a first RRC message to the user equipment when the time alignment timer of the group of primary cells expires, the first RRC message being used for de-configuring configuration of sounding reference signal transmission of the plurality of secondary cells in the group of secondary cells, or transmitting a first MAC CE message to the user equipment, the first MAC CE message being used for deactivating at least one activated secondary cell in the group of secondary cells.

Furthermore according to another aspect of the invention, in an embodiment, there is provided a method, in a user equipment of a carrier aggregation transmission-based radio communication network, of controlling uplink transmission of the user equipment over a plurality of secondary cells in a group of secondary cells, the user equipment being configured with a group of primary cells and at least one group of secondary cells, the group of secondary cells belonging to the at least one group of secondary cells, and the group of primary cells and the at least one group of secondary cells being configured with a common time alignment timer, wherein the method comprises the steps of: determining whether a time alignment value of the group of secondary cells is valid when the time alignment timer is in operation; and if the time alignment value of the group of secondary cells is invalid, terminating the uplink transmission over at least one activated secondary cell in the group of secondary cells and transmitting a notification message to a base station.

In another embodiment, there is provided a method, in a base station of a carrier aggregation transmission-based radio communication network, of controlling uplink transmission of a user equipment over a plurality of secondary cells in a group of secondary cells, the user equipment being configured with a group of primary cells and at least one group of secondary cells, the group of secondary cells belonging to the at least one group of secondary cells, and the group of primary cells and the at least one group of secondary cells being configured with a common time alignment timer, wherein the method comprises the steps of: determining whether a time alignment value of the group of secondary cells is valid when the time alignment timer is in operation; and if the time alignment value of the group of secondary cells is invalid, transmitting an RRC message to the user equipment, the RRC message being used for de-configuring configuration of sounding reference signal transmission of the plurality of secondary cells in the group of secondary cells, or transmitting an MAC CE message to the user equipment, the MAC CE message being used for deactivating at least one activated secondary cell in the group of secondary cells.

Furthermore according to a further aspect of the invention, in an embodiment, there is provided a method, in a base station of a carrier aggregation transmission-based radio communication network, of controlling uplink transmission of a user equipment over a plurality of secondary cells in a group of secondary cells, the user equipment being configured with a group of primary cells and at least one group of secondary cells, the group of secondary cells belonging to the at least one group of secondary cells, and the group of primary cells and the at least one group of secondary cells being configured with a common time alignment timer, wherein when the time alignment timer expires, the method comprises the steps of: —determining whether a time alignment value of the group of secondary cells is valid; —if the time alignment value of the group of secondary cells is valid, keeping the valid time alignment value of the group of secondary cells; and —if the time alignment value of the group of secondary cells is invalid, discarding the time alignment value of the group of secondary cells.

Optionally when the time alignment timer restarts counting and the base station keeps the valid time alignment value of the group of secondary cells, the method further comprises the step of: —transmitting the valid time alignment value of the group of secondary cells to the user equipment via a second message.

In another embodiment, there is provided a method, in a user equipment of a carrier aggregation transmission-based radio communication network, of controlling uplink transmission of the user equipment over a plurality of secondary cells in a group of secondary cells, the user equipment being configured with a group of primary cells and at least one group of secondary cells, the group of secondary cells belonging to the at least one group of secondary cells, and the group of primary cells and the at least one group of secondary cells being configured with a common time alignment timer, wherein when the time alignment timer expires, the method comprises the step of: —discarding a time alignment value of the group of secondary cells.

Optionally when the time alignment timer restarts counting, the method further comprises the step of: —receiving a second message from a base station, the second message including a valid time alignment value of the group of secondary cells.

In another embodiment, there is provided a method, in a user equipment of a carrier aggregation transmission-based radio communication network, of controlling uplink transmission of the user equipment over a plurality of secondary cells in a group of secondary cells, the user equipment being configured with a group of primary cells and at least one group of secondary cells, the group of secondary cells belonging to the at least one group of secondary cells, and the group of primary cells and the at least one group of secondary cells being configured with a common time alignment timer, wherein when the time alignment timer expires, the method comprises the step of: —discarding a time alignment value of the group of secondary cells.

Optionally when the time alignment timer restarts counting, the method further comprises the steps of: —terminating uplink transmission over all secondary cells in the group of secondary cells; —if a secondary cell configured with random access in the group of secondary cells is in an active status, triggering initiatively a random access procedure over the secondary cell configured with the random access, or triggering the random access procedure over the secondary cell configured with the random access in response to a PDCCH order signaling from a base station; and —if the secondary cell configured with the random access in the group of secondary cells is in an inactive status, activating the secondary cell configured with the random access in the group of secondary cells in response to an MAC CE message from the base station and triggering automatically the random access procedure over the secondary cell configured with the random access, or activating the secondary cell configured with the random access in the group of secondary cells in response to the MAC CE message from the base station and triggering the random access procedure over the secondary cell configured with the random access in response to the PDCCH order signaling from the base station.

In another embodiment, there is provided a method, in a base station of a carrier aggregation transmission-based radio communication network, of controlling uplink transmission of a user equipment over a plurality of secondary cells in a group of secondary cells, the user equipment being configured with a group of primary cells and at least one group of secondary cells, the group of secondary cells belonging to the at least one group of secondary cells, and the group of primary cells and the at least one group of secondary cells being configured with a common time alignment timer, wherein when the time alignment timer expires, the method comprises the step of: —discarding a time alignment value of the group of secondary cells.

Optionally when the time alignment timer restarts counting, the method comprises the steps of: —transmitting an RRC message to the user equipment, the RRC message being used for de-configuring configuration of sounding reference signal transmission of the plurality of secondary cells in the group of secondary cells, or transmitting an MAC CE message to the user equipment, the MAC CE message being used for deactivating at least one activated secondary cell in the group of secondary cells; —if a secondary cell configured with random access in the group of secondary cells is in an active status, transmitting a PDCCH order signaling to the user equipment, the PDCCH order signaling being used for instructing the user equipment to trigger a random access procedure; and —if the secondary cell configured with the random access in the group of secondary cells is in an inactive status, transmitting an MAC CE message to the user equipment, the MAC CE message being used for instructing the user equipment to activate the secondary cell configured with the random access in the group of secondary cells and instructing the user equipment not to perform uplink transmission after 8 ms and for instructing the user equipment to trigger the random access procedure, or transmitting an MAC CE message to the user equipment and then transmitting a PDCCH order signaling to the user equipment, the MAC CE message being used for instructing the user equipment to activate the secondary cell configured with the random access in the group of secondary cells and instructing the user equipment not to perform the uplink transmission after 8 ms, and the PDCCH order signaling being used for instructing the user equipment to trigger the random access procedure.

In another embodiment, there is provided a method, in a user equipment of a carrier aggregation transmission-based radio communication network, of controlling uplink transmission of the user equipment over a plurality of secondary cells in a group of secondary cells, the user equipment being configured with a group of primary cells and at least one group of secondary cells, the group of secondary cells belonging to the at least one group of secondary cells, and the group of primary cells and the at least one group of secondary cells being configured with a common time alignment timer, wherein when the time alignment timer expires, the method comprises the step of: —keeping a time alignment value of the group of secondary cells.

Optionally when the time alignment timer restarts counting and the time alignment value of the group of secondary cells kept by the user equipment is valid, the method further comprises the step of: —resuming automatically the uplink transmission with the kept time alignment value until a new time alignment value is received from a base station.

In another embodiment, there is provided a method, in a base station of a carrier aggregation transmission-based radio communication network, of controlling uplink transmission of a user equipment over a plurality of secondary cells in a group of secondary cells, the user equipment being configured with a group of primary cells and at least one group of secondary cells, the group of secondary cells belonging to the at least one group of secondary cells, and the group of primary cells and the at least one group of secondary cells being configured with a common time alignment timer, wherein when the time alignment timer expires, the method comprises the steps of: —determining whether a time alignment value of the group of secondary cells is valid; —if the time alignment value of the group of secondary cells is valid, keeping the time alignment value of the group of secondary cells; and —if the time alignment value of the group of secondary cells is invalid, discarding the time alignment value of the group of secondary cells.

Optionally when the time alignment timer restarts counting and the base station discards the time alignment value of the group of secondary cells, the method comprises the steps of: —if configuration of sounding reference signal transmission of at least one activated secondary cell in the group of secondary cells is de-configured, transmitting a PDCCH order signaling to the user equipment to instruct the user equipment to trigger a random access procedure over the group of secondary cells, and then transmitting an RRC message to the user equipment to instruct the user equipment to reconfigure the configuration of the sounding reference signal transmission of the de-configured secondary cells in the group of secondary cells; and —if the at least one activated secondary cell in the group of secondary cells is deactivated, transmitting an MAC CE message to the user equipment to instruct the user equipment to reactivate the deactivated secondary cells in the group of secondary cells and to instruct the user equipment not to perform the uplink transmission, and then transmitting a PDCCH order signaling to instruct the user equipment to trigger the random access procedure over the group of secondary cells.

BRIEF DESCRIPTION OF DRAWINGS

Other features, objects and advantages of the invention will become more apparent upon reading the following detailed description of non-limiting embodiments with reference to the drawings in which.

Throughout the drawings, identical or like reference numerals denote identical or like reference step features or devices/modules.

DETAILED DESCRIPTION OF EMBODIMENTS

Respective embodiments of the invention will be described below respectively for a scenario where each time alignment group of the user equipment 10 is configured with a time alignment timer and a scenario where the user equipment 10 is configured with a time alignment timer.

Without loss of generality, the following description will be given taking the user equipment 10 being configured with one primary cell group PG and one secondary cell group SG as an example. It shall be appreciated that the user equipment 10 can be configured with more than one secondary cell group in a practical application, and in the event that the user equipment 10 is configured with a plurality of secondary cell groups, it is necessary to control uplink transmission of the user equipment 10 over secondary cells in each secondary cell group when the time alignment timer of the primary cell group PG expires. The uplink transmission may include Sounding Reference Signal (SRS) transmission.

In the scenario where each time alignment group of the user equipment 10 is configured with a time alignment timer, each of the primary cell group PG and the secondary cell group SG is configured with a time alignment timer.

Specifically, in an embodiment, when the time alignment timer of the primary cell group PG expires, the user equipment 10 de-configures automatically the configuration of Sounding Reference Signal (SRS) transmission of a plurality of secondary cells in the secondary cell group SG. The plurality of secondary cells include at least one activated secondary cell in the secondary cell group SG.

Figure 1:
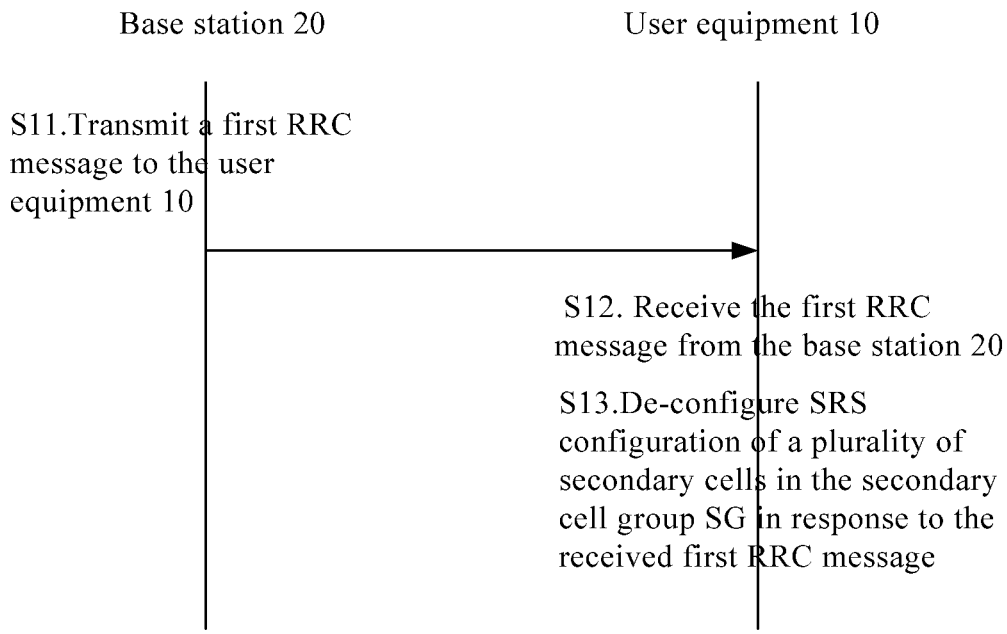
FIG. 1 illustrates a flow chart of a method of de-configuring the SRS configuration of the secondary cell according to an embodiment of the invention.

In another embodiment, as illustrated in FIG. 1, when the time alignment timer of the primary cell group PG expires, the base station 20 transmits a first RRC message to the user equipment 10 in the step S11. The first RRC message is used for de-configuring the SRS configuration of the plurality of secondary cells in the secondary cell group.

In the step S12, the user equipment 10 receives the first RRC message from the base station 20. Then in the step S13, the user equipment 10 de-configures the SRS configuration of the plurality of secondary cells in the secondary cell group SG in response to the received first RRC message. The plurality of secondary cells include at least one activated secondary cell in the secondary cell group SG.

Figure 2:
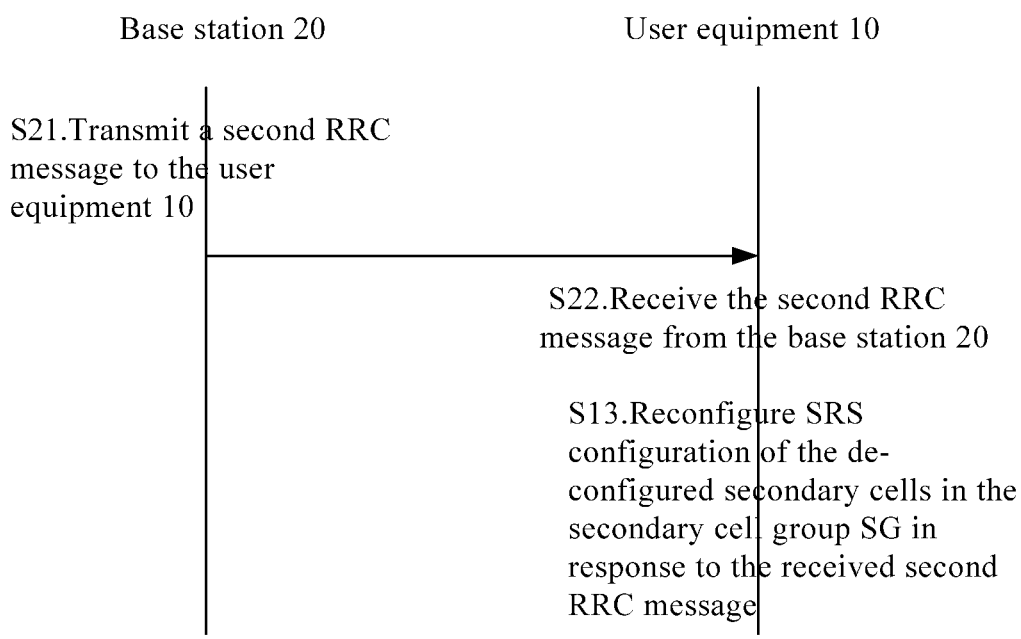
FIG. 2 illustrates a flow chart of a method of reconfiguring the de-configured SRS configuration of the secondary cell according to an embodiment of the invention.

As for the scenario of de-configuration, when the time alignment timer of the primary cell group PG restarts counting, as illustrated in FIG. 2, the base station 20 transmits a second RRC message to the user equipment 10 in the step S21. The second RRC message is used for reconfiguring the SRS configuration of the de-configured secondary cells in the secondary cell group SG.

In the step S22, the user equipment 10 receives the second RRC message from the base station 20. Then in the step S23, the user equipment 10 reconfigures the SRS configuration of the de-configured secondary cells in the secondary cell group SG in response to the received second RRC message.

In a further embodiment, when the time alignment timer of the primary cell group PG expires, the user equipment 10 deactivates automatically at least one activated secondary cell in the secondary cell group SG, for example, the user equipment disables the deactivation timer of the activated secondary cell in the secondary cell group SG.

Figure 3:
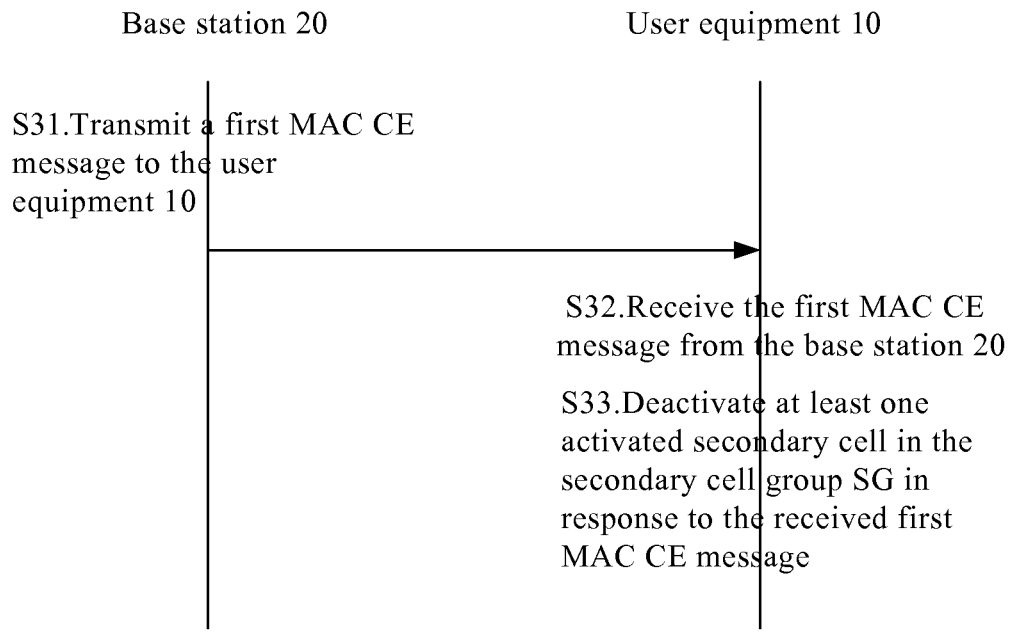
FIG. 3 illustrates a flow chart of a method of deactivating the secondary cell according to an embodiment of the invention.

In a further embodiment, as illustrated in FIG. 3, when the time alignment timer of the primary cell group PG expires, the base station 20 transmits a first MAC CE message to the user equipment 10 in the step S31. The first MAC CE message is used for deactivating at least one activated secondary cell in the secondary cell group SG.

In the step S32, the user equipment 10 receives the first MAC CE message from the base station 20. Then in the step S33, the user equipment 10 deactivates at least one activated secondary cell in the secondary cell group SG in response to the received first MAC CE message, for example, disables the deactivation timer of the activated secondary cell in the secondary cell group SG.

As for the scenario of deactivation, when the time alignment timer of the primary cell group PG restarts counting, the user equipment 10 reactivates automatically the deactivated secondary cell in the secondary cell group SG in an embodiment.

Figure 4:
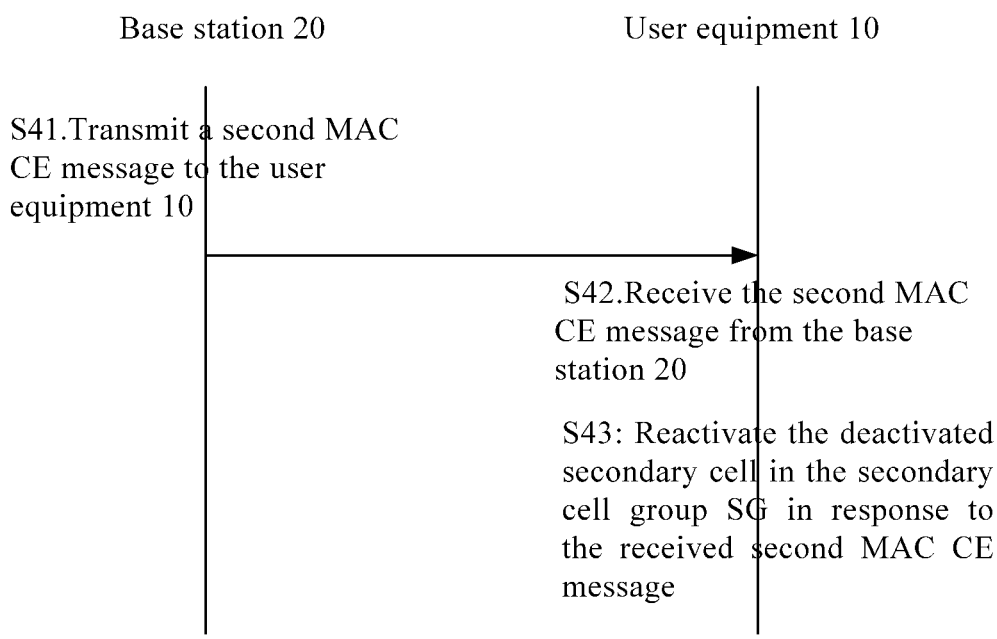
FIG. 4 illustrates a flow chart of a method of reactivating the deactivated secondary cell according to an embodiment of the invention.

In another embodiment, when the time alignment timer of the primary cell group PG restarts counting, as illustrated in FIG. 4, the base station 20 transmits a second MAC CE message to the user equipment 10 in the step S41. The second MAC CE message is used for reactivating the deactivated secondary cell in the secondary cell group SG.

In the step S42, the user equipment 10 receives the second MAC CE message from the base station 20. Then in the step S43, the user equipment 10 reactivates the deactivated secondary cell in the secondary cell group SG in response to the received second MAC CE message.

In the scenario where the user equipment 10 is configured with a time alignment timer, the primary cell group PG and the secondary cell group SG are configured with a common time alignment timer.

In this scenario, a new secondary cell group status is defined as a status of virtual-UL-SYN (virtual uplink synchronization). When the time alignment timer is in operation and the time alignment value of the secondary cell group is no longer valid, the secondary cell group is deemed as being in the status of virtual-UL-SYN.

In an embodiment, the base station 20 determines whether the secondary cell group SG is in the status of virtual-UL-SYN, that is determines whether the time alignment value of the secondary cell group SG is valid when the time alignment timer is still in operation.

If the time alignment value of the secondary cell group SG is invalid, then the base station 20 transmits an RRC message to the user equipment 10. The RRC message is used for de-configuring the SRS configuration of a plurality of secondary cells in the secondary cell group SG.

Upon reception of the RRC message from the base station 20, the user equipment 10 de-configures the SRS configuration of the plurality of secondary cells in the secondary cell group SG in response to the RRC message. The plurality of secondary cells include at least one activated secondary cell in the secondary cell group SG.

Alternatively, if the time alignment value of the secondary cell group SG is invalid, then the base station 20 transmits an MAC CE message to the user equipment 10. The MAC CE message is used for deactivating the activated secondary cell in the secondary cell group SG.

Upon reception of the MAC CE message from the base station 20, the user equipment 10 deactivates the activated secondary cell in the secondary cell group SG in response to the MAC CE message, for example, disables the deactivation timer of the activated secondary cell in the secondary cell group SG.

In another embodiment, the user equipment 10 determines whether the secondary cell group SG is in the status of virtual-UL-SYN, that is determines whether the time alignment value of the secondary cell group SG is valid when the time alignment timer is still in operation.

If the time alignment value of the secondary cell group SG is invalid, then the user equipment 10 de-configures automatically the SRS configuration of a plurality of secondary cell in the secondary cell group SG and notifies the base station 20 that the SRS configuration of the plurality of secondary cells in the secondary cell group SG is removed. The plurality of secondary cells include at least one activated secondary cell in the secondary cell group SG.

Alternatively, if the time alignment value of the secondary cell group SG is invalid, then the user equipment 10 deactivates automatically the activated secondary cell in the secondary cell group SG, for example, the user equipment 10 disables the deactivation timer of the activated secondary cell in the secondary cell group SG and notifies the base station 20 that the activated secondary cell in the secondary cell group SG is deactivated.

In a variant embodiment, the user equipment 10 notifies the base station 20 that the secondary cell group SG is in the status of virtual-UL-SYN status, that is, the time alignment value of the secondary cell group SG is invalid, instead of performing an automatic de-configuration or deactivation operation by itself, upon determining that the secondary cell group SG is in the status of virtual-UL-SYN status.

Upon reception of the notification message, the base station 20 may transmit an RRC message to the user equipment 10, the RRC message being used for de-configuring the SRS configuration of a plurality of secondary cells in the secondary cell group SG and the plurality of secondary cells include at least one activated secondary cell in the secondary cell group SG; or transmits an MAC CE message to the user equipment 10, the MAC CE message being used for deactivating the activated secondary cell in the secondary cell group SG.

As for the foregoing scenario where the base station 20 determines whether the time alignment value of the secondary cell group SG is valid, only the base station 20 knows whether the time alignment value of the secondary cell group SG is valid, and the user equipment 10 always considers that the time alignment value of the secondary cell group SG is valid.

In this scenario, when the time alignment timer expires, the following three scenarios may be assumed:

In a first scenario, the base station 20 keeps the time alignment value of the secondary cell group SG, and the user equipment 10 discards the time alignment value of the secondary cell group SG, such that the base station 20 has the valid time alignment value of the secondary cell group SG and the user equipment 10 does not have the time alignment value of the secondary cell group SG.

In a second scenario, both the base station 20 and the user equipment 10 discard the time alignment value of the secondary cell group SG regardless of whether the time alignment value of the secondary cell group SG is valid, such that neither the base station 20 nor the user equipment 10 has the time alignment value of the secondary cell group SG.

In a third scenario, the base station 20 only keeps the valid time alignment value of the secondary cell group SG, and the user equipment 10 always keeps the time alignment value of the secondary cell group SG and considers that it is valid, thus resulting in the following two sub-scenarios:

In a first sub-scenario, when the time alignment value of the secondary cell group SG is valid, both the base station 20 and the user equipment 10 have the valid time alignment value of the secondary cell group SG; and In a second sub-scenario, when the time alignment value of the secondary cell group SG is invalid, the base station does not have the time alignment value of the secondary cell group SG, and the user equipment has the invalid time alignment value of the secondary cell group SG.

With the first scenario occurring after the time alignment timer expires, when the time alignment timer restarts counting, the user equipment 10 will not perform any random access, and the valid time alignment value of the secondary cell group SG kept by the base station 20 can still be used. In order to resume uplink transmission over the secondary cell group SG, the base station 200 will simply notify the user equipment 10 of the valid time alignment value of the secondary cell group SG.

Specifically, in an embodiment, the base station 20 transmits the valid time alignment value to the user equipment 10 via an RRC message.

In another embodiment, the base station 20 transmits the valid time alignment value to the user equipment 10 via an MAC CE message.

The valid time alignment value transmitted from the base station 20 to the user equipment 10 may be an absolute time alignment value or a relative time alignment value, for example.

After the user equipment 10 obtains the valid time alignment value, the secondary cell group SG will automatically be changed to an uplink synchronization status and restart uplink transmission.

With the second scenario occurring after the time alignment timer expires, when the time alignment timer restarts counting, the secondary cell group SG shall be in the status of virtual uplink synchronization and will not allow any uplink transmission regardless of whether the secondary cell in the secondary cell group SG is in an active/inactive status or in a SRS configured/de-configured status.

Then a random access procedure shall be triggered to regain a valid time alignment value.

Specifically, if a secondary cell configured with random access in the secondary cell group SG, that is, a secondary cell over which random access is configured to be performed, is in an active status, then the user equipment 10 triggers automatically a random access procedure over the secondary cell configured with random access.

Alternatively the base station 20 can transmit a PDCCH order signaling to the user equipment 10, and the PDCCH order signaling is used for instructing the user equipment 10 to trigger a random access procedure. The user equipment 10 triggers the random access procedure over the secondary cell configured with random access in response to the PDCCH order signaling, upon reception of the PDCCH order signaling.

If a secondary cell configured with random access in the secondary cell group SG, that is, a secondary cell over which random access is configured to be performed, is in an inactive status, then the base station 20 transmits an MAC CE message to the user equipment 10, and the MAC CE message is used for instructing the user equipment 10 to activate the secondary cell configured with random access in the secondary cell group SG and instructing the user equipment 10 not to perform uplink transmission after 8 ms and further for instructing the user equipment 10 to trigger a random access procedure. The user equipment 10 activates the random access procedure over the secondary cell configured with random access upon reception of the MAC CE message and then triggers automatically the random access procedure over the secondary cell configured with random access.

Alternatively, the base station 20 firstly transmits an MAC CE message to the user equipment 10, the MAC CE message being used for instructing the user equipment 10 to activate the secondary cell configured with random access in the secondary cell group SG and instructing the user equipment 10 not to perform uplink transmission after 8 ms, and then transmits a PDCCH order signaling to the user equipment 10, the PDCCH order signaling being used for instructing the user equipment 10 to trigger a random access procedure.

The user equipment 10 activates the secondary cell configured with random access in the secondary cell group SG in response to the received MAC CE message and then triggers the random access procedure over the secondary cell configured with random access in response to the PDCCH order signaling.

With the third scenario occurring after the time alignment timer expires, when the time alignment timer restarts counting, for the first sub-scenario, the user equipment 10 has the valid time alignment value of the secondary cell group SG in the first sub-scenario, so the user equipment 10 can simply resume automatically uplink transmission with the kept time alignment value until a new time alignment value is received from the base station 20 in this sub-scenario.

In the second sub-scenario, if the SRS configuration of the activated secondary cell in the secondary cell group SG is de-configured, then the base station 20 transmits a PDCCH order signaling to the user equipment 10 to instruct the user equipment 10 to trigger a random access procedure over the secondary cell group SG and then transmits an RRC message to the user equipment 10 to instruct the user equipment 10 to reconfigure the SRS configuration of the de-configured secondary cells in the secondary cell group SG.

If the activated secondary cell in the secondary cell group SG is deactivated, then the base station 20 transmits an MAC CE message to the user equipment 10 to instruct the user equipment 10 to reactivate the deactivated secondary cell in the secondary cell group SG and instructs the user equipment 10 not to perform uplink transmission and then transmits a PDCCH order signaling to the user equipment 10 to instruct the user equipment 10 to trigger a random access procedure over the secondary cell group SG.

The embodiments of the invention have been disclosed above. It shall be appreciated that the invention will not be limited to the foregoing embodiments and that those skilled in the art can make various variations and modifications without departing from the scope of the invention.

The invention claimed is:

1. A user equipment configured for a carrier aggregation transmission-based radio communication network, for controlling uplink transmission of the user equipment over a plurality of secondary cells in a group of secondary cells, the user equipment being configured with at least one primary cell of a group of primary cells and at least one group of secondary cells, the group of secondary cells belonging to the at least one group of secondary cells, and the group of primary cells and the at least one group of secondary cells each being configured with a time alignment timer, wherein the user equipment comprises:
   at least one processor;
   and at least one memory including computer program code;
   the at least one memory and the computer program code configured to, with the at least one processor, cause the user equipment at least to perform:
   terminating the uplink transmission over at least one activated secondary cell in the group of secondary cells when the time alignment timer of the group of primary cells expires, wherein the terminating comprises:
   de-configuring the configuration of sounding reference signal transmission of the at least one activated secondary cell in the group of secondary cells when the time alignment timer of the primary cell group expires.

2. The user equipment according to claim 1, wherein the terminating comprises:
   automatically de-configuring a configuration of the Sounding Reference Signal transmission of the plurality of secondary cells in the group of secondary cells.

3. The user equipment according to claim 1, wherein the terminating comprises:
   receiving a first RRC message from a base station, the first RRC message being used for de-configuring a configuration of the Sounding Reference Signal transmission of the plurality of secondary cells in the group of secondary cells; and
   de-configuring the configuration of the Sounding Reference Signal transmission of the plurality of secondary cells in the group of secondary cells in response to the first RRC message.

4. The user equipment according to claim 1, wherein the terminating comprises:
   automatically deactivating the at least one activated secondary cell in the group of secondary cells.

5. The user equipment according to claim 1, wherein the terminating comprises:
   receiving a first MAC CE message from a base station, the first MAC CE message being used for deactivating the at least one activated secondary cell in the group of secondary cells; and
   deactivating the at least one activated secondary cell in the group of secondary cells in response to the first MAC CE message.

6. The user equipment according to claim 2, wherein when the time alignment timer of the primary cell group restarts counting, the at least one memory and the computer program code are configured to, with the at least one processor, cause the user equipment at least to perform:
   receiving a second RRC message from a base station, the second RRC message being used for reconfiguring the configuration of the Sounding Reference Signal transmission of the de-configured secondary cells in the group of secondary cells; and
   reconfiguring the configuration of the Sounding Reference Signal transmission of the de-configured secondary cells in the group of secondary cells in response to the second RRC message.

7. The user equipment according to claim 4, wherein when the time alignment timer of the primary cell group restarts counting, the at least one memory and the computer program code are configured to, with the at least one processor, cause the user equipment at least to perform:
   automatically reactivating the deactivated secondary cells in the group of secondary cells.

8. The user equipment according to claim 4, wherein the at least one memory and the computer program code are configured to, with the at least one processor, cause the user equipment at least to perform:
   receiving a second MAC CE message from a base station, the second MAC CE message being used for reactivating the deactivated secondary cells in the group of secondary cells; and
   reactivating the deactivated secondary cells in the group of secondary cells in response to the second MAC CE message.

9. A method, performed by a user equipment, of a carrier aggregation transmission-based radio communication network, of controlling uplink transmission of the user equipment over a plurality of secondary cells in a group of secondary cells, the user equipment being configured with at least one primary cell group and at least one group of secondary cells, the group of secondary cells belonging to the at least one group of secondary cells, and the group of primary cells and the at least one group of secondary cells each being configured with a time alignment timer, wherein the method comprises:
   terminating the uplink transmission over at least one activated secondary cell in the group of secondary cells when the time alignment timer of the group of primary cells expires, wherein the terminating comprises:
   de-configuring the configuration of sounding reference signal transmission of the at least one activated secondary cell in the group of secondary cells when the time alignment timer of the primary cell group expires.

10. The method according to claim 9, wherein the terminating comprises:
   automatically de-configuring a configuration of the Sounding Reference Signal transmission of the plurality of secondary cells in the group of secondary cells.

11. The method according to claim 9, wherein the terminating comprises:
   receiving a first RRC message from a base station, the first RRC message being used for de-configuring a configuration of the Sounding Reference Signal transmission of the plurality of secondary cells in the group of secondary cells; and
   de-configuring the configuration of the Sounding Reference Signal transmission of the plurality of secondary cells in the group of secondary cells in response to the first RRC message.

12. The method according to claim 9, wherein the terminating comprises:
   automatically deactivating the at least one activated secondary cell in the group of secondary cells.

13. The method according to claim 9, wherein the terminating comprises:
   receiving a first MAC CE message from a base station, the first MAC CE message being used for deactivating the at least one activated secondary cell in the group of secondary cells; and
   deactivating the at least one activated secondary cell in the group of secondary cells in response to the first MAC CE message.

14. The method according to claim 10, wherein when the time alignment timer of the primary cell group restarts counting the method further comprises:
   receiving a second RRC message from a base station, the second RRC message being used for reconfiguring the configuration of the Sounding Reference Signal transmission of the de-configured secondary cells in the group of secondary cells; and
   reconfiguring the configuration of the Sounding Reference Signal transmission of the de-configured secondary cells in the group of secondary cells in response to the second RRC message.

15. The method according to claim 12, wherein when the time alignment timer of the primary cell group restarts counting the method further comprises:
   automatically reactivating the deactivated secondary cells in the group of secondary cells.

16. The method according to claim 12, wherein the method further comprises:
   receiving a second MAC CE message from a base station, the second MAC CE message being used for reactivating the deactivated secondary cells in the group of secondary cells; and
   reactivating the deactivated secondary cells in the group of secondary cells in response to the second MAC CE message.

* * * * *